(12) United States Patent
Rodels et al.

(10) Patent No.: US 6,866,214 B2
(45) Date of Patent: Mar. 15, 2005

(54) FISHING REEL

(76) Inventors: Len Rodels, #1403, 10160-115 Street, Edmonton, Alberta (CA), T5K 1T6; Simon Kotik, 9920-179 Street, Edmonton, Alberta (CA), T5T 3P8

( * ) Notice: Subject to any disclaimer, the term of this patent is extended or adjusted under 35 U.S.C. 154(b) by 0 days.

(21) Appl. No.: 10/621,673

(22) Filed: Jul. 17, 2003

(65) Prior Publication Data

US 2004/0016837 A1 Jan. 29, 2004

(30) Foreign Application Priority Data

Jul. 26, 2002 (CA) .............................................. 2395791

(51) Int. Cl.$^7$ .............................................. A01K 89/01
(52) U.S. Cl. .................... 242/313; 242/291; 242/318
(58) Field of Search ........................ 242/223, 290–292, 242/310, 312, 313, 317, 318, 323; 43/41

(56) References Cited

U.S. PATENT DOCUMENTS

| | | | | |
|---|---|---|---|---|
| 2,706,096 A | * | 4/1955 | Rufle ....................... | 242/405.3 |
| 3,136,066 A | * | 6/1964 | Spinn ......................... | 33/745 |
| 3,166,268 A | * | 1/1965 | Clark ......................... | 242/258 |
| 3,765,618 A | * | 10/1973 | Johnson et al. ............. | 242/317 |
| 3,784,124 A | * | 1/1974 | Shumate et al. ............ | 242/297 |
| 4,049,217 A | * | 9/1977 | Koopman ................... | 242/249 |
| 4,548,367 A | * | 10/1985 | Councilman ................ | 242/306 |
| 5,048,436 A | | 9/1991 | Thiele ........................ | 112/228 |
| 5,235,773 A | | 8/1993 | Rinehart ..................... | 43/17 |
| 5,249,387 A | | 10/1993 | Slocum et al. ................ | 43/16 |
| 5,259,566 A | | 11/1993 | Kalle ......................... | 242/257 |
| 5,626,303 A | | 5/1997 | Bringsen .................... | 242/265 |
| 5,752,667 A | | 5/1998 | Merrill et al. ............. | 242/317 |
| 5,921,492 A | | 7/1999 | Bauer ........................ | 242/317 |
| 6,000,652 A | * | 12/1999 | Zwayer et al. ............. | 242/238 |
| 6,024,318 A | | 2/2000 | Barry ........................ | 242/406 |

FOREIGN PATENT DOCUMENTS

| | | | | |
|---|---|---|---|---|
| GB | 2245887 A | 7/1991 | | 16/8 |
| JP | 11-208755 | 8/1999 | | |
| RU | 2060660 | 5/1996 | | |
| SU | 598593 | 4/1976 | | |
| SU | 1264886 | 10/1986 | | |
| WO | WO 01/74153 | 3/2001 | | 89/16 |

* cited by examiner

*Primary Examiner*—Emmanuel Marcelo
(74) *Attorney, Agent, or Firm*—Davis & Bujold, P.L.L.C.

(57) ABSTRACT

A fishing reel which includes a body with a circular spool receiving cavity having a peripheral sidewall, an annular spool supporting surface which defines a central opening, and at least one line feed channel through the peripheral sidewall. An annular spool is positioned within the spool receiving cavity and is supported by the spool supporting surface. The spool has a circumferential line receiving cavity. The line receiving cavity is closed by the peripheral sidewall of the spool receiving cavity. The spool is rotated manually. A brake is provided for braking the rotation of the spool.

20 Claims, 4 Drawing Sheets

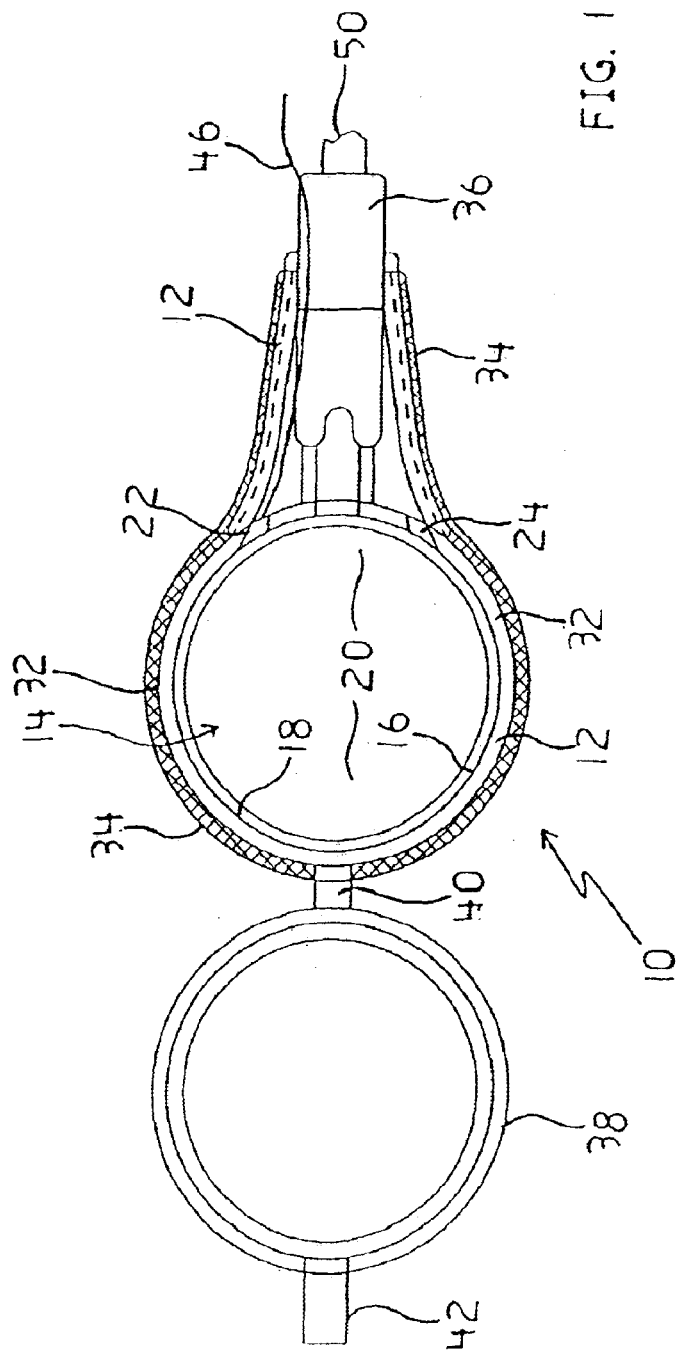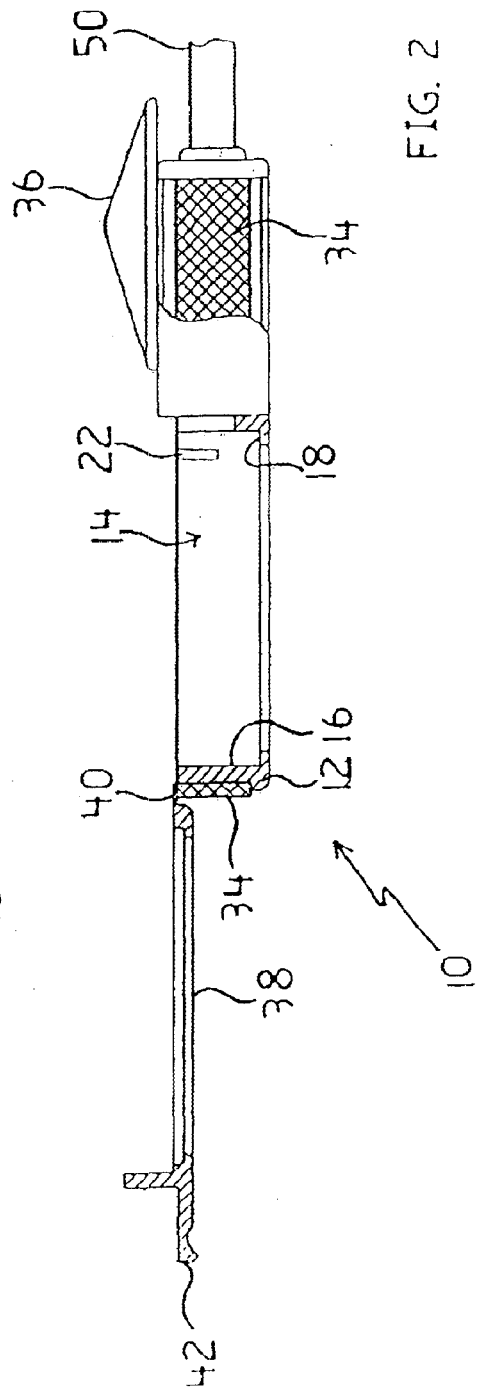

FISHING REEL

FIELD OF THE INVENTION

The present invention relates to a fishing reel and, in particular, a fishing reel that is less prone to tangles.

BACKGROUND OF THE INVENTION

A problem associated with fishing reels is the tangling of fishing line. Fishing reels have a centrally disposed axle upon which a spool of fishing line rotates. As the fishing line is rapidly rewound onto or unravelled from a fishing reel, excess fishing line can be come tangled in the axle of the fishing reel, rendering it inoperable.

SUMMARY OF THE INVENTION

What is required is fishing reel that is less prone to fishing line tangles.

According to the present invention there is provided fishing reel which includes a body with a circular spool receiving cavity having a peripheral sidewall, an annular spool supporting surface which defines a central opening, and at least one line feed channel through the peripheral sidewall. An annular spool is positioned within the spool receiving cavity and is supported by the spool supporting surface. The spool has a circumferential line receiving cavity. The line receiving cavity is closed by the peripheral sidewall of the spool receiving cavity. Means are provided for rotating the spool. Means are provided for retaining the spool in the spool receiving cavity. Means are provided for braking the rotation of the spool. Means are provided for attaching the body to a fishing rod.

With the fishing reel, as described above, fishing line is positioned in the line receiving cavity which is closed by the peripheral sidewall of the spool receiving cavity. This arrangement reduces, if not eliminating entirely, the possibility of the line becoming tangled as it is rewound onto or unravelled from the fishing reel.

Although beneficial results may be obtained through use of the fishing reel, as described above, even more beneficial results may be obtained when the means for retaining the spool in the spool receiving cavity is a pivotally mounted closure on the body which closes the spool receiving cavity. It is preferred that the body be made out of polymer plastic and the closure integrally formed with a living hinge. By having the closure integrally formed and connected to the body by a living hinge, closure can be moved between the open position and the closed position, but cannot become inadvertently separated from the fishing reel.

Although beneficial results may be obtained through use of the fishing reel, as described above, even more beneficial results may be obtained when the means for rotating the spool is a crank on the spool.

Although beneficial results may be obtained through use of the fishing reel, as described above, even more beneficial results may be obtained when at least a portion of the peripheral sidewall of the spool receiving cavity is resiliently deformable and the means for braking the rotation of the spool is by deforming the peripheral sidewall of the spool receiving cavity to engage the spool. Braking the rotation of the spool by deforming the peripheral sidewall to engage the spool allows for the line tension to be regulated by hand and dramatically decreases the possibility that the line will break when setting the hook or while a fish has been hooked and is on the run.

Although beneficial results may be obtained through the use of the fishing reel, as described above, even more beneficial results may be obtained when peripheral sidewall of the spool receiving cavity is thermally insulated with a material such as polyetheylene foam. This makes the fishing reel better suited for ice fishing or fishing in cold weather.

Although beneficial results may be obtained through use of the fishing reel, as described above, even more beneficial results may be obtained when a three position spool locking lever is provided on the body. The lever is movable between a locking position, an operational position and a release position. In the locking position the lever engages the spool to prevent rotation. In the operational position the spool can rotate freely while being retained in the spool receiving cavity by the lever. In the release position the lever is spaced from the spool enabling the spool to be removed from the spool receiving cavity.

Although beneficial results may be obtained through use of the fishing reel, as described above, even more beneficial results may be obtained when there are two alternative line feed channels through the peripheral sidewall. A first of the two line feed channels is used when left handed operation is desired and a second line feed channel is used when right handed operation when right handed operation is desired.

Although beneficial results may be obtained through use of the fishing reel, as described above, even more beneficial results may be obtained when the body is made of polymer plastic and floats in water, so that in the event the fishing reel is inadvertently dropped into a body of water, it will not sink and can easily be retrieved.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 1 is a top plan view of a fishing reel constructed in accordance with the teachings of the present invention, with the locking lever in the open position and the annular spool removed.

FIG. 2 is a side elevation view, in section, of the fishing reel illustrated in FIG. 1.

DETAILED DESCRIPTION OF THE PREFERRED EMBODIMENT

Figure 3:
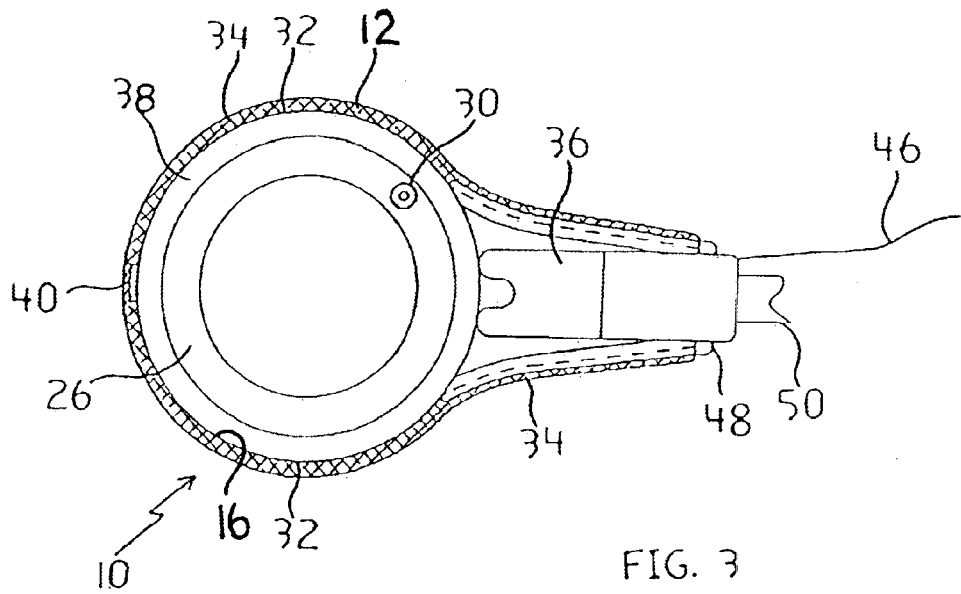
FIG. 3 is a top plan view, in section, of the fishing reel illustrated in FIG. 1, with the annular spool in position, the annular closure closed, and the locking lever in the operating position.

The preferred embodiment, a fishing reel generally identified by reference numeral 10, will now be described with reference to FIGS. 1 through 9.

Structure and Relationship of Parts:

Referring to FIGS. 1 and 2, there is provided a fishing reel 10, which includes a body 12 with a circular spool receiving cavity 14 which has a peripheral sidewall 16. Referring to FIG. 1, an annular spool supporting surface 18 is provided which defines a central opening 20. A first line feed channel 22 and a second line feed channel 24 are provided which extend through peripheral sidewall 16. First line feed channel 22 is provided for left handed operation and second line feed channel 24 is provided for right handed operation of fishing reel 10.

Figure 4:
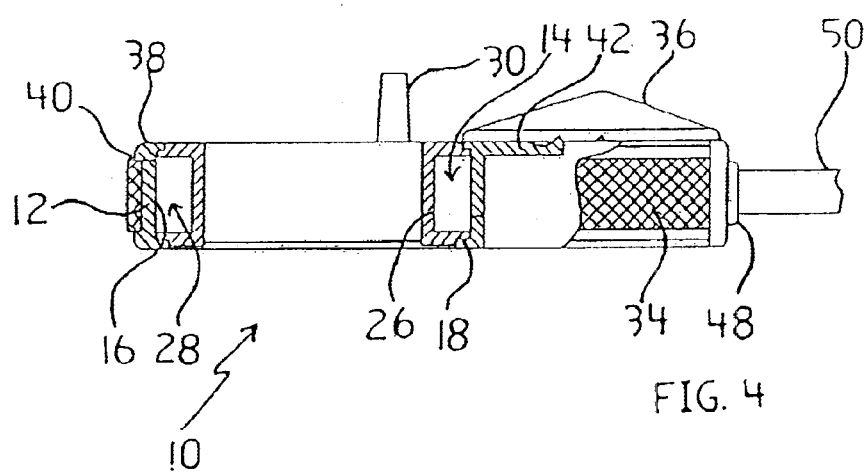
FIG. 4 is a side elevation view, in section, of the fishing reel illustrated in FIG. 3.
Figure 7:
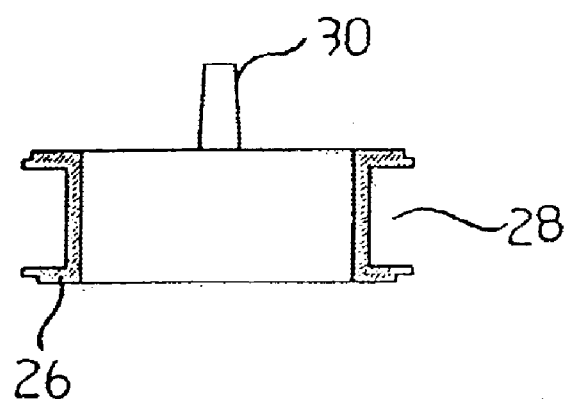
FIG. 7 is a side elevation view of the annular spool illustrated in FIG. 6.

Referring to FIG. 4, an annular spool 26 is positioned within spool receiving cavity 14 and is supported by spool supporting surface 18. Referring to FIG. 7, spool 26 has a circumferential line receiving cavity 28. Referring to FIG. 4, when spool 26 is inserted into spool receiving cavity 14, line receiving cavity 28 of spool 26 is closed by peripheral sidewall 16 of spool receiving cavity 14.

Figure 6:
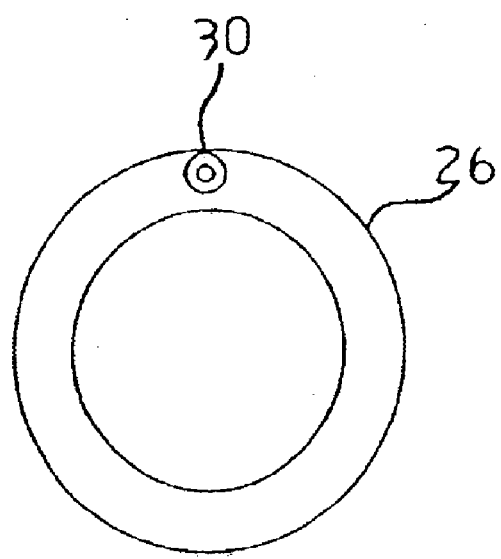
FIG. 6 is a top plan view of the annular spool.

Referring to FIG. 6, a crank 30 is provided on spool 26 for rotating spool 26. Referring to FIG. 3, peripheral sidewall 16 of spool receiving cavity 28 is resiliently deformable. Squeezing at points identified by reference number 32, serves to deforming peripheral sidewall 16 of spool receiving cavity 28 to engage spool 26, which serves as the means for braking the rotation of spool 26. Peripheral sidewall 16 of spool receiving cavity 14 is insulated with polyethylene foam, generally indicated by reference numeral 34, so peripheral sidewall 16 does not conduct the cold.

Figure 8:
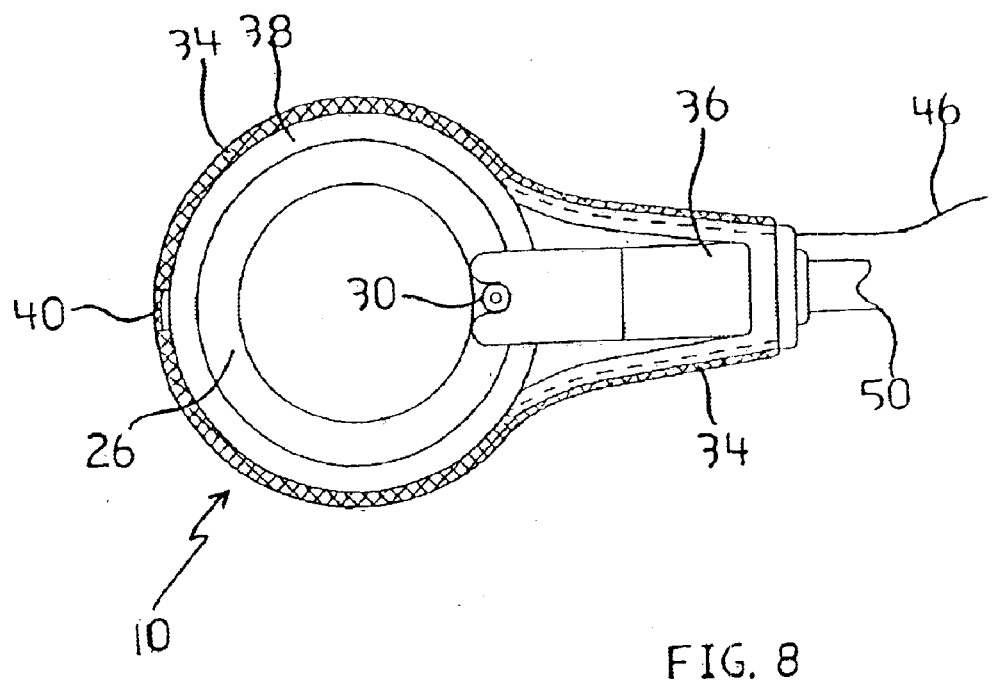
FIG. 8 is a top plan view of the fishing reel illustrated in FIG. 1, with the locking lever in the locked position.
Figure 9:
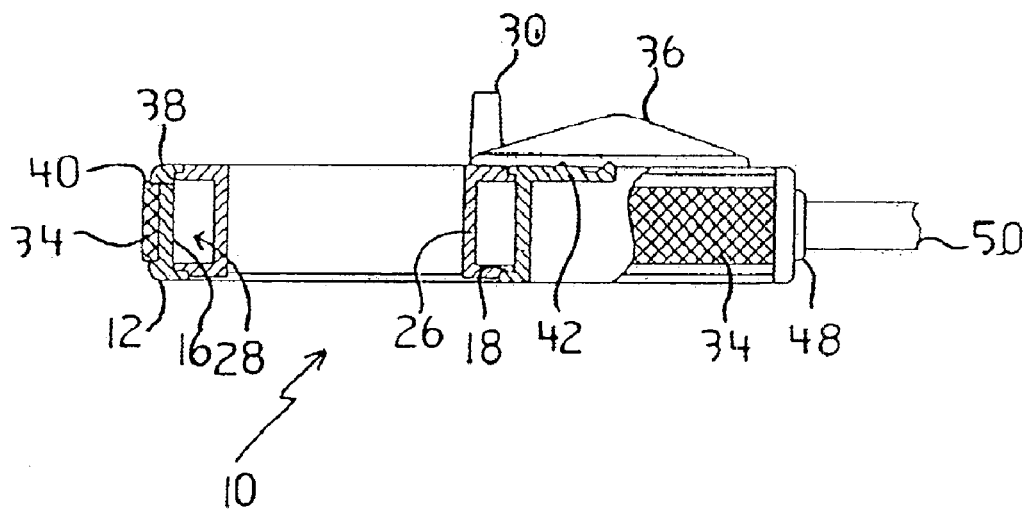
FIG. 9 is a side elevation view, in section, of the fishing reel illustrated in FIG. 8.

Referring to FIG. 3, a spool locking lever 36 is provided on body 12. Lever 36 has three positions: a locking position, an operational position and a release position. The locking position is illustrated in FIGS. 8 and 9. The release position is illustrated in FIGS. 1 and 2. The operational position is illustrated in FIGS. 3 and 4. Referring to FIGS. 8 and 9, in the locking position, lever 36 engages spool 26 to prevent rotation while in the locking position. In the illustrated embodiment lever 36 is shown as engaging crank 30, but this need not be the case. Referring to FIGS. 1 and 2, in the release position lever 36 is spaced from spool 26 enabling closure 38 to be opened and spool 26 to be removed. Referring to FIGS. 3 and 4, in the operational position spool 26 can rotate freely, but lever 36 prevents spool 26 from being removed from spool receiving cavity 14.

Referring to FIGS. 1 and 2, body 12 has a pivotally mounted annular closure 38 which closes spool receiving cavity 14. In the illustrated embodiment, body 12 is made out of polymer plastic and closure 38 is integrally formed with a living hinge 40, however it will be appreciated that other means can be provided for pivotally mounting annular closure 38 to body 12. A lever engaging member 42 is positioned on annular closure 38 in opposed relation to living hinge 40. Referring to FIG. 4, when annular closure 38 is in the closed position, lever 36 engages lever engaging member 42 on annular closure 38 to maintain annular closure 38 in the closed position. Referring to FIGS. 1 and 2, to release annular closure 38 so that it can be pivoted to the open position, lever 36 is moved to the release position spaced from lever engaging member 42 on annular closure 38 which permits annular closure 38 to be pivoted to the open position.

Figure 5:
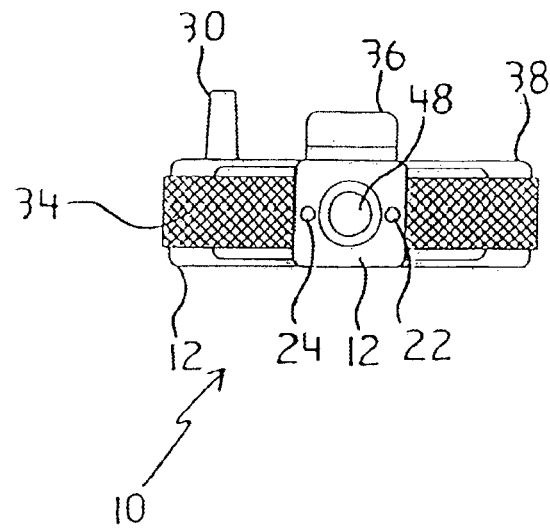
FIG. 5 is an end elevation view of the fishing reel illustrated in FIG. 3.

Referring to FIG. 5, body 12 has a female receptacle 48. Referring to FIGS. 3 and 4, female receptacle is adapted to receive a fishing rod 50. Referring to FIG. 5, fishing line 46 extends through a selected one of either first line feed channel 22 or second line feed channel 24. Referring to FIG. 3, fishing line 46 then extends down side of fishing rod 50.

Operation:

The use and operation of fishing reel 10, will now be described with reference to FIGS. 1 through 9.

Referring to FIGS. 1 and 2, to use fishing reel 10 as described above, annular spool 26 (illustrated in FIGS. 6 and 7) is placed in circular spool receiving cavity 14 of fishing reel 10. Depending on whether the user is right handed or left handed, fishing line 46 that is wound on annular spool 26 can be fed through either first feed channel 22 or second feed channel 24. Referring to FIG. 4, annular closure 38 is pivoted to the closed position and lever 36 is moved to an operational position to engage lever engaging member 42 on annular closure 38 to maintain annular closure 38 in the closed position while enabling annular spool 26 to rotate freely with annular closure 38 in the closed position, fishing line 46 on annular spool 26 is protected from damage of UV rays. Referring to FIG. 3, fishing rod 50 is then inserted into female receptacle 48 (illustrated in FIG. 5) and fishing line 46 is run along fishing rod 50. Lever 36 is then moved to the locked position, illustrated in FIGS. 8 and 9 during transport to the fishing site.

Referring to FIG. 3, fishing reel 10 is readied for use by moving lever 36 to the operational position. Fishing line 46 must be manually pulled in order to be fed out from annular spool 26. Fishing line 46 is rewound onto annular spool 26 by using crank 30 that is provided on annular spool 26 to rotate annular spool 26 in the desired direction. The tension of fishing line 46 can be controlled by exerting pressure at point 32 to resiliently deform peripheral sidewall 16 of spool receiving cavity 14 so as to brake the rotation of annular spool 26. As fishing reel 10 does not have an axle, excess fishing line 46 cannot become tangled in it during use. Referring to FIGS. 8 and 9, when the fisherman is taking a break from fishing or when he is packing up to head home or to another site, lever 36 is returned to the locked position. Fishing reel 10 is readied for use again by moving, lever 36 to the operational position which enables spool 26 to rotate freely.

Referring to FIG. 1, as body 12 is made of polymer plastic, it will float in water, so that in the event fishing reel 10 is inadvertently dropped into a body of water, it will not sink and can easily be retrieved. Furthermore, fishing reel 10 is particularly suitable for ice fishing and fishing in cold climates as the peripheral sidewall 16 is insulated with polyethylene foam so that peripheral sidewall 16 does not conduct the cold.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A fishing reel, comprising:
   a body with a circular spool receiving cavity of a first diameter extending through the body from a first end of the body to a second end of the body and defined solely by a peripheral sidewall, the body including an annular spool supporting surface projecting inward from the peripheral sidewall at the second end to define a central opening concentric with the cavity and having a second diameter less than the first diameter a spool receiving opening of the first diameter concentric with and into the spool receiving cavity at the first end of the body, and at least one line feed channel through the peripheral sidewall;

an axle-less annular spool positioned within the spool receiving cavity and rotatably, supported solely by the spool supporting surface, the spool having a circumferential line receiving cavity and the line receiving cavity being closed by the peripheral sidewall of the spool receiving cavity;

means for rotating the spool;

means for retaining the spool in the spool receiving cavity;

means for braking the rotation of the spool; and means for attaching the body to a fishing rod.

2. The fishing reel as defined in claim 1, wherein the means for attaching the body to a fishing rod is a female receptacle in the body which is adapted to receive a fishing rod in mating engagement.

3. The fishing reel as defined in claim 1, wherein the means for retaining the spool in the spool receiving cavity is a pivotally mounted closure on the body which closes the spool receiving cavity.

4. The fishing reel as defined in claim 3, wherein the closure is annular.

5. The fishing reel as defined in claim 3, wherein the body is made out of polymer plastic and the closure is integrally formed with a living hinge.

6. The fishing reel as defined in claim 1, wherein the means for rotating the spool is a crank on the spool.

7. The fishing reel as defined in claim 1, wherein at least a portion of the peripheral sidewall of the spool receiving cavity is resiliently deformable and the means for braking the rotation of the spool is by deforming the peripheral sidewall of the spool receiving cavity to engage the spool.

8. The fishing reel as defined in claim 7, wherein the peripheral sidewall of the spool receiving cavity is thermally insulated.

9. The fishing reel as defined in claim 8, wherein the peripheral sidewall of the spool receiving cavity is thermally insulated with polyethylene foam.

10. The fishing reel as defined in claim 1, wherein a three position spool locking lever is provided on the body, the lever being movable between a locking position, an operational position and a release position, in the locking position the lever engages the spool to prevent rotation, in the operational position the spool can rotate freely while being retained in the spool receiving cavity by the lever, in the release position the lever is spaced from the spool enabling the spool to be removed from the spool receiving cavity.

11. The fishing reel as defined in claim 1, wherein there are two line feed channels through the peripheral sidewall, a first line feed channel for left handed operation and a second line feed channel for right handed operation.

12. The fishing reel as defined in claim 1, wherein the body is made of polymer plastic and floats in water.

13. A fishing reel, comprising:

a polymer plastic body with a circular spool receiving cavity having a peripheral sidewall, an annular spool supporting surface which defines a central opening, and at least one line feed channel through the peripheral sidewall;

a female receptacle in the body adapted to receive a fishing rod in mating engagement;

an annular closure which closes the spool receiving cavity, the closure being integrally formed with the body and connected by a living hinge;

an annular spool positioned within the spool receiving cavity and supported by the spool supporting surface, the spool having a circumferential line receiving cavity, the line receiving cavity being closed by the peripheral sidewall of the spool receiving cavity;

a crank on the spool by means of which the spool is rotated;

at least a portion of the peripheral sidewall of the spool receiving cavity being resiliently deformable, such that rotation of the spool is braked by deforming the peripheral sidewall of the spool receiving cavity to engage the spool; and a three position spool locking lever on the body, the lever being movable between a locking position, an operational position and a release position, in the locking position the lever engages the spool to prevent rotation, in the operational position the spool can rotate freely while being retained in the spool receiving cavity by the lever, in the release position the lever is spaced from the spool enabling the spool to be removed from the spool receiving cavity.

14. The fishing reel as defined in claim 13, wherein the peripheral sidewall of the spool receiving cavity is thermally insulated.

15. The fishing reel as defined in claim 14, wherein the peripheral sidewall of the spool receiving cavity is thermally insulated with polyethylene foam.

16. The fishing reel as defined in claim 13, wherein there are two line feed channels through the peripheral sidewall, a first line feed channel for left handed operation and a second line feed channel for right handed operation.

17. The fishing reel as defined in claim 13, wherein the body is made of polymer plastic and floats in water.

18. A fishing comprising;

a body with a circular spool receiving cavity defined solely by peripheral sidewall, there being no end walls, an annular spool supporting surface which projects inwardly from the peripheral sidewall to define a central opening, and at least one line feed channel through the peripheral sidewall;

an annular spool positioned within the spool receiving cavity and supported solely by the spool supporting surface, there being no axle, the spool having a circumferential line receiving cavity, the line receiving cavity being closed by the peripheral sidewall of the spool receiving cavity;

means for rotating the spool;

means for retaining the spool in the spool receiving cavity;

means for braking the rotation of the spool; and means for attaching the body to a fishing rod.

19. The fishing reel as defined in claim 18, wherein at least a portion of the peripheral sidewall of the spool receiving cavity is resiliently deformable and the means for braking the rotation of the spool is by deforming the peripheral sidewall of the spool receiving cavity to engage the spool.

20. The fishing reel as defined in claim 18, wherein a three position spool locking lever is provided on the body, the lever being movable between a locking position, an operational position and a release position, in the locking position the lever engages the spool to prevent rotation, in the operational position the spool can rotate freely while being retained in the spool receiving cavity by the lever, in the release position the lever is spaced from the spool enabling the spool to be removed from the spool receiving cavity.

* * * * *